June 18, 1929.                J. E. MILLER                1,717,803
                           STEAM GAUGE BRACKET
                             Filed Aug. 2, 1927

Inventor
J. E. Miller

By   Emil F. Lange
                          Attorney

Patented June 18, 1929.

1,717,803

UNITED STATES PATENT OFFICE.

JOSEPH E. MILLER, OF HAVELOCK, NEBRASKA.

STEAM-GAUGE BRACKET.

Application filed August 2, 1927. Serial No. 210,119.

My invention relates to steam gauge brackets and more particularly to the type of steam gauge bracket or holder which is designed to be used for supporting the steam gauges in locomotives.

My primary object is the provision of a steam gauge bracket into which a steam gauge may be latched or from which it may be removed in the minimum amount of time and with the least possible amount of work.

A second object of my invention is the provision of a bracket of the kind specified which may be manufactured at the lowest possible cost.

Especially is it my object to provide a steam gauge bracket which will securely hold the steam gauge under any and all conditions of vibration and which is fool proof to the extent that no partial latching may occur which might release the steam gauge during the jolting of the locomotive.

Having in view these objects and others which will be pointed out in the following description, I will now refer to the drawings, in which Figure 1 is a view in perspective of my steam gauge bracket.

Figure 3:
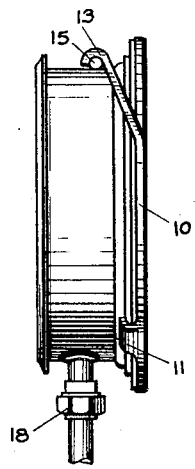
Figure 3 is an elevational view showing the edge of the steam gauge bracket and of the steam gauge.

The base 10 of the steam gauge bracket is preferably formed from heavy sheet metal, my preferred material being 3/16 inch tank steel. This is cut into more or less circular form of substantially the size or diameter of the base of the steam gauge. In the cutting or punching process four ears are provided on the base. The lower ears 11 project radially while the upper ear 12 projects tangentially and in a horizontal direction and the upper ear 13 projects tangentially and in an upward direction. These ears are all then turned as shown in the drawings. The ears 11 are adapted to engage the flange of the steam gauge. The ear 12 is provided with apertures for the reception of a cotter pin 14 or other pivot member to which the arm 15 is secured. In order to maintain the arm 15 in spaced relation to the base 10, I insert a sleeve 16 within the ear 12 and through which the pivot 14 passes. The ear 13 is bent outwardly to form a latching hook at its upper extremity. The rod 15 is made from resilient material, my preference being for spring steel.

Figure 2:
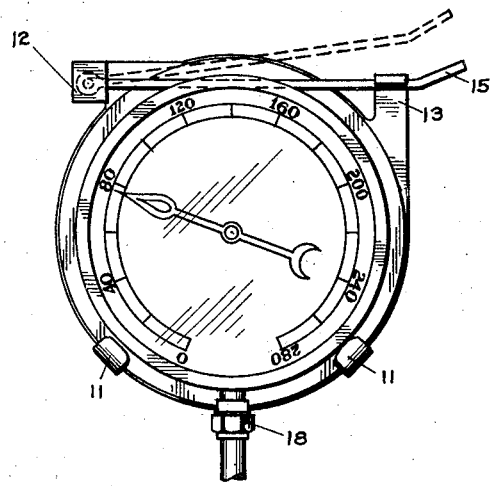
Figure 2 is a plan view showing the steam gauge bracket with the steam gauge in place and showing also the lever arm in both its latched and unlatched position.
Figure 1:
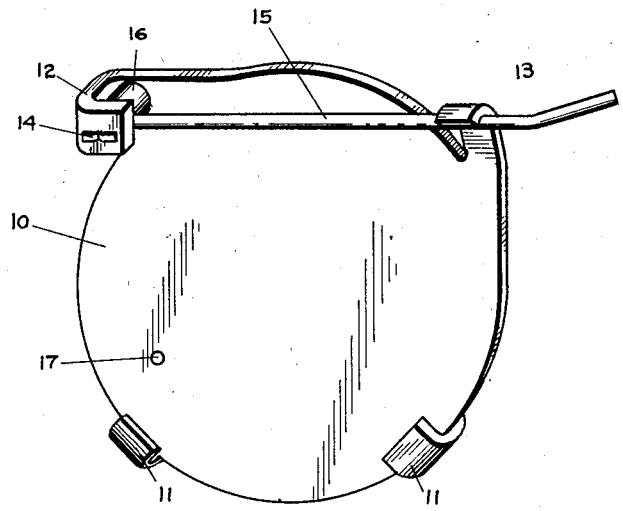

The steam gauge bracket as above described is permanently fixed in place in the locomotive. One or more apertures 17 may be provided whereby bolts or other fastening devices may be used for securing the bracket in place. If desired, any heat insulating material may be employed to space the steam gauge bracket from its support in the locomotive. In placing the steam gauge in position in the bracket the nut 18 is first released and the steam gauge is then placed against the base 10 with its flange seated underneath the ears 11. The rod 15 is then brought down forcibly against the body of the steam gauge as shown in Figures 2 and 3 and its end is then latched in the hook 13. The coupling 15 is then closed and the gauge is ready for use.

Steam gauges are commonly applied directly to their supports by means of bolts or the like. When it is necessary to change or adjust steam gauges, it becomes necessary to remove these bolts and then to insert them after the changes have been made. The location of such steam gauges is usually at such a high temperature that it is necessary for the workman to use gloves and the result is that the manipulation of the hot bolts becomes very difficult. In consequence bolts are very often mislaid and the steam gauge is thus loosely put on so that it becomes further loosened through the jarring of the locomotive. This difficulty is even greater whenever it is necessary to space the steam gauge from its support by means of blocks of wood or the like. With my bracket the blocks of wood may be applied and left permanently in place.

I am aware that other brackets have been designed and that they have come into limited use for the purpose which I have in mind. Such brackets as have come to my attention are more or less complicated, it requires from two to three times as much work and time to manipulate them as is required with my steam gauge bracket and they are furthermore defective in that they depend on the use of a coiled springs or other resilient retaining devices which soon become weakened under the intense heat to which they are constantly subjected. My bracket on the other hand is so made that it cannot get out of order either from the high temperature or from the vibration and it can be manipulated by simply latching or unlatching the free end of the rod 15. My bracket has the further important advantage over all prior brackets of the kind in that it is made from simple materials and in the simplest possible manner, no welding or other expensive and cumbersome steps being required.

Having thus described my invention in such full, clear, and exact terms that its construction and operation will be readily understood by others skilled in the art to which it pertains, what I claim as new and desire to secure by Letters Patent of the United States is:

A steam gauge bracket including a sheet metal base and being provided with means for securing it in place, a pair of hook like members for engaging the flange of the steam gauge, said hook like members projecting at spaced apart points from the lower peripheral edge of said sheet metal base and integral therewith, a U-shaped member projecting from said sheet metal base in a horizontal and radial direction, a lever arm seated at one of its extremities within said U-shaped member, a sleeve also seated within said U-shaped member for spacing said lever arm from said sheet metal base, a pivot pin passing through said U-shaped member and through said lever and through said sleeve, said lever arm being adapted to engage the body portion of the steam gauge, and an ear integral with said sheet metal base and projecting upwardly and tangentially therefrom into the path of the free end portion of said lever arm and terminating in a hook like end portion for releasably latching said lever arm when in its operative position.

In testimony whereof I affix my signature.

JOSEPH E. MILLER.